United States Patent [19]

Crowson

[11] Patent Number: 4,923,068
[45] Date of Patent: May 8, 1990

[54] AUTOMATIC FILTER SYSTEM

[75] Inventor: Francis R. Crowson, Mount Airy, Md.

[73] Assignee: CDP Product Development Corporation, Mount Airy, Md.

[21] Appl. No.: 306,905

[22] Filed: Feb. 7, 1989

[51] Int. Cl.$^5$ ............................................. C02F 1/00
[52] U.S. Cl. ..................................... 210/741; 210/108; 210/142; 210/333.01; 210/340; 55/96; 55/302
[58] Field of Search ........... 210/648, 340, 341, 333.01, 210/108, 90, 741, 142, 333.1; 55/96, 302

[56] References Cited

U.S. PATENT DOCUMENTS

| | | | |
|---|---|---|---|
| 1,150,086 | 8/1915 | Willemstyn | 210/333.1 |
| 2,271,814 | 2/1942 | Coolidge | 210/333.1 |
| 2,490,533 | 12/1949 | McAlear | 210/108 |
| 2,970,696 | 2/1961 | Mummert | 210/138 |
| 3,056,499 | 10/1962 | Liddell | 210/340 |
| 3,402,189 | 9/1968 | Sasaki | 210/333.01 |
| 3,498,910 | 3/1970 | Mendelson | 210/23 |
| 3,533,507 | 10/1970 | Aitken | 210/140 |
| 3,794,169 | 2/1974 | Sisk et al. | 210/140 |
| 4,089,781 | 5/1978 | Asp | 210/67 |
| 4,217,700 | 8/1980 | Muller | 34/19 |
| 4,282,105 | 8/1981 | Crowe | 210/798 |
| 4,500,435 | 2/1985 | Muller | 210/798 |
| 4,552,669 | 11/1985 | Sekellick | 210/798 |
| 4,592,847 | 6/1986 | Schumacker | 210/770 |
| 4,636,306 | 1/1987 | Radmall | 210/108 |
| 4,830,747 | 5/1989 | Kubota | 210/333.1 |

Primary Examiner—Bernard Nozick
Attorney, Agent, or Firm—Ronald P. Kananen

[57] ABSTRACT

A method and apparatus for automatically propelling a charge of backwash fluid by a compressed gas such as steam to backwash a filter in a filter pair. The method and apparatus provides for backwashing a filter with at least three backwash phases, a first mainly comprising a charge of backwash fluid passing through the filter with significant speed, a second relating to use of flashing steam for secondary cleaning and scrubbing of the filter elements, and a third relating to use of low pressure steam for autoclaving and sterilizing the filter.

10 Claims, 6 Drawing Sheets

| FILTER | OPERATION | VALVES CLOSED | VALVES OPEN | REMARKS |
|---|---|---|---|---|
| 1. F-1 | FILTERING | 40,32b,20b,48,38,49 | 20a,32a | OP'N CONTINUES 'TIL Hi∆P |
| 2. F-1 | Hi∆F, START BW | 20a,32a,38,40,49 | 48,58 | #1 ISOLATED & DRAINING |
| 3. F-2 | STARTUP | 20a,32a,38,40,49 | 20b,32b | SIMULTANEOUS WITH STEP 2 |
| 4. F-1 | BACKWASH | 20a,32a | 48,38 | 38 OPENS IN 0.2 SEC |
| 5. F-1 | ISOLATE | 20a,32a,48,38 | — | STANDBY |
| 6. F-2 | PRESS. RECHARGE | 20a,32a,38,49 | 20b,32b,40 | WET SWITCH W CLOSES 40 |
| 7. P | HEATER OPERATES | 38,40 | | PRESS. TRANSDUCER STOPS HEAT 460 PSI |
| 8. F-2 | FILTERING | 20a,32a,49,40,38,48 | 20b,32b | OP'N CONTINUES 'TIL Hi∆P |
| 9. F-2 | Hi∆P, START BW | 20b,32b,38,40,48 | 49,59 | #2 ISOLATED & DRAINING |
| 10. F-1 | STARTUP | 20b,32b,48,38,40 | 20a,32a | SIMULTANEOUS WITH STEP 9 |
| 11. F-2 | BACKWASH | 20b,32b | 49,40 | 40 OPENS IN 0.2 SEC |
| 12. F-2 | ISOLATE | 20b,32b,49,40 | — | STANDBY |
| 13. F-1 | PRESS RECHARGE | 20b,32b,40,49 | 20a,32a,38 | WET SWITCH W CLOSES 38 |
| 14. P | HEATER OPERATES | 38,40 | | PRESS TRANSDUCER STOPS HEAT 460 PSI |
| 15. | REPEAT STEP 1 | | | |

FIG. 6

AUTOMATIC FILTER SYSTEM

BACKGROUND OF THE INVENTION

This invention relates to a method and apparatus for automatically backwashing a filter. More particularly, this invention relates to a method and apparatus for automatically propelling a charge of backwash fluid by a compressed gas such as steam to backwash a filter in a filter pair. Still more particularly, this invention relates to a method and apparatus for backwashing a filter with at least three backwash phases, a first mainly comprising a charge of backwash fluid passing through the filter with significant speed, a second relating to use of flashing steam for secondary cleaning and scrubbing of the filter elements, and a third relating to use of low pressure steam for autoclaving and sterilizing the filter.

Pressure filtration of fluids through various cylindrical configurations of wound or woven filter media is well known to the art. Precoating of such filter septums with a pulverized solid, forming an aggregate interlocking mass thus providing a filter medium with submicron porosity, was developed at least as early as 1942 by the U.S. Army Corps of Engineers. Generally, an unfiltered fluid is introduced from the peripheral surface to an axial filtered product collection chamber of the filter septum or septums until an accumulation of suspended solids upon the surface sufficiently obstructs the porosity of the media to inhibit fluid passage.

Subsequent cleaning of the barrier media by a liquid counterflow through the media is an equally well-established principle, and is regularly employed wherever cylindrical septums are used as a primary filter media or as the base barrier for precoat filtration. For example, U.S. Pat. No. 3,794,169 to Sisk et al. discloses an apparatus for producing a rapid reduction in housing pressure followed by a high velocity slug of liquid to dissociate collected solids from a filtration membrane surface. Such an apparatus constitutes an apparent improvement in that the slug of high velocity liquid produces transient shear forces between the liquid and one side of the membrane to dissociate the solids and gels which tend to collect adjacent to the one surface of the membrane, thereby improving the rate at which filtrate flows through the membrane.

An improved liquid filter in which contaminated liquid is pumped into an inlet chamber, through a filter element and into an outlet chamber uses compressed air held in compartments in the inlet and outlet chambers. When the filter element becomes clogged, it is isolated by valves, and the compressed air in the inlet chamber is vented to permit the compressed air in the outlet chamber to force liquid back through the filter element to dislodge deposited contaminants. Such a system is disclosed in U.S. Pat. No. 4,282,105 to Crowe. Other systems also perform a backwash of a filter by releasing a stored volume of a gas retrograde to the filter flow through the septums, as shown for example in U.S. Pat. Nos. 3,794,169; 4,089,781; 4,217,700; and 4,552,669, each of which is directed to pneumatic backwash systems.

A severe limitation on the backwash selected is the ability of the filter medium to withstand the flow and velocity required to dislodge entrapped solids and retain its physical integrity. The backwash evolution is therefore a carefully engineered balance of velocity, volume, and density of the backwash fluid to achieve the required degree of cleanliness.

Despite the number of systems available and the understandings of the prior art, no such system is yet currently available which achieves multiple levels of laving with change of state of the laving fluid occurring through the filter medium within the filter. For example, for filters used in the food or beverage industries, it would be preferable to backwash the filter under conditions which achieve a sterilization of the filter as well as a backwashing to dislodge entrained solids. Thus, it has remained a problem in the art to develop an operating system which includes a filter element which backwashes a liquid charge through the filter elements, using superheated water flashing to steam under controlled circumstances to provide a secondary scrubbing action and also performing a germicidal or autoclaving action on the filter elements in a controlled manner.

Accordingly, it is a general object of this invention to provide a novel operating system which includes means for backwashing the filter element with a gas-propelled slug of liquid.

It is another overall object of this invention to provide a novel operating system which includes a filter element wherein the control of the backwashing of the filter element is automatic.

It is another overall object of this invention to provide a pressure vessel in combination with a filter element so that a compressed bubble of gas, such as steam, provides motive force to a volume of liquid, such as water, to propel a charge of the liquid through the filter element.

It is still another overall object of this invention to provide a quick-acting valve in combination with a pressure vessel housing fluid so that a charge of backwash fluid having a volume about equal to the filter volume is propelled through the elements as a solid slug of water and moving with sufficient speed that the thermal wavefront of the expanding steam cannot cause two-phase flow or flashing within the initial volume of fluid reaching the filter elements.

It is still another feature of this invention to provide a secondary cleaning action on the filter elements by causing the thermally superheated volume of water to flash to steam in a controlled manner after an initial volume of superheated water has laved the filter elements.

It is still another feature of the invention to control the expansion of the escaping steam volume so that the pressure is at about 10 to about 15 psig whereupon the filter valves isolate the filter vessel when full of low pressure steam thus permitting the low pressure steam to dissipate its heat as it cools to perform a germicidal or autoclaving action upon the filter elements.

It is still another object of this invention to provide a microprocessor-controlled scheme for sequencing the valves in a multi-filter system to provide a controlled backwash for the filter on an automatic basis.

Finally, it is another object of this invention, for a filter system of the type described, to cause the cooling of the low pressure steam in the laved vessel to contract to a minute fraction of its initial volume upon turning to liquid, thereby providing an advantageous partial pressure or vacuum condition inside the vessel.

These and other objects of the invention will become apparent from a detailed written description of the invention which follows, taken in conjunction with the accompanying drawings.

BRIEF SUMMARY OF THE INVENTION

Directed to achieving the foregoing objects and to overcoming problems associated with prior art filter backwash systems, the invention in one of its aspects includes at least one filter element in combination with a pressure dome housing, a steam slug adjacent a column of fluid, so that upon release by a control member, the column of fluid is physically propelled retrograde through the filter element to achieve backwash. Preferably, a pair of such filter elements are used in parallel, and in combination with a plurality of controlled valves to isolate various physical constituents in the system.

DETAILED DESCRIPTION OF THE PREFERRED EMBODIMENTS

Figure 1:
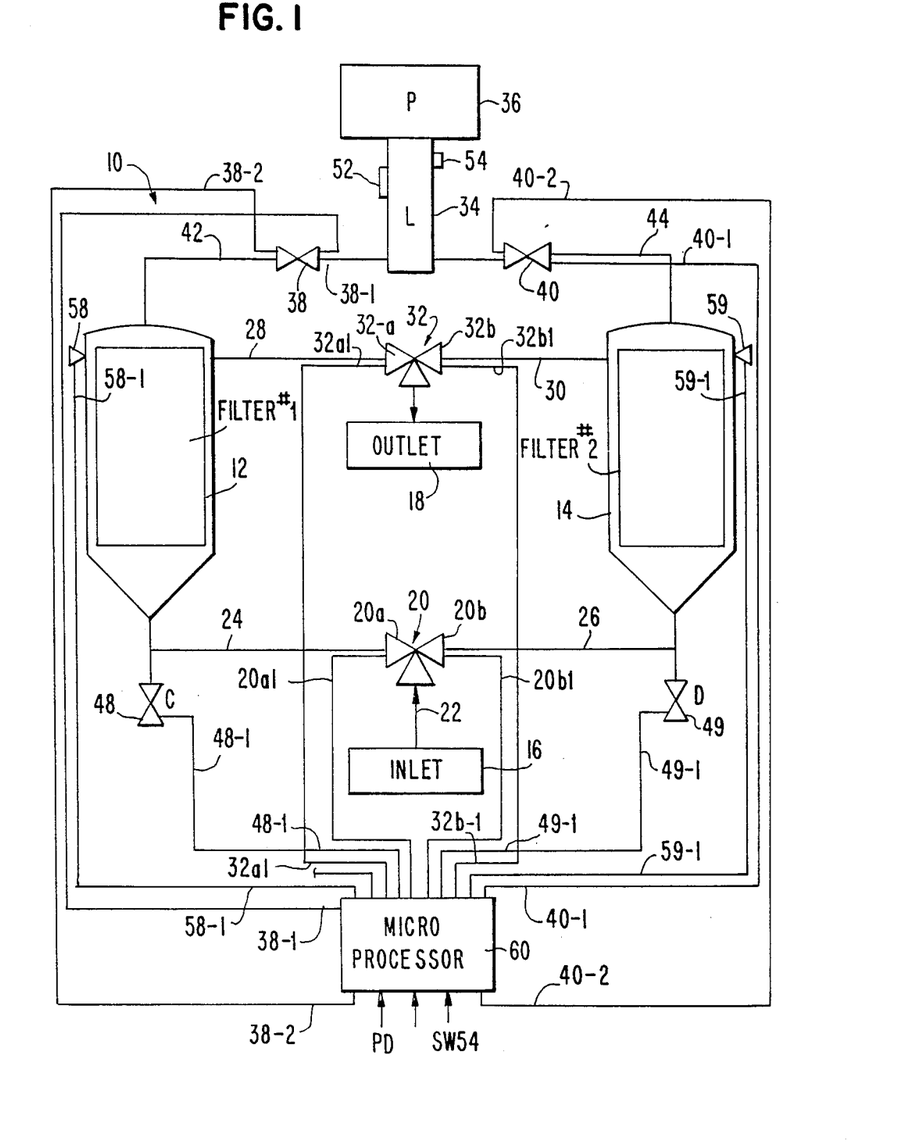
FIG. 1 is a simplified block diagram of the system according to the invention.

FIG. 1 shows, in a simplified block diagram form, an embodiment of the invention which is designated generally by the reference number 10. The system 10 includes a first filter 12 and a second filter 14 connected in parallel with a system inlet and a system outlet 18. The system inlet 16 is connected through a conduit 22 through a bidirectional valve 20 for connection respectively through the conduits 24 and 26 to the inlets of the first and second filters 12, 14. The valve 20 includes a first inlet valve 20a controlled by a signal on line 20a1 and a second inlet valve 20b controlled by a signal on line 20b1. The valves 20a and 20b work in a complementary fashion so that when the valve 20a is open, placing the first filter 12 in circuit with the inlet fluid, the valve 20b is closed, thus isolating the second filter 14.

The outlets of the first and second filters 12, 14 respectively are connected through conduits 28, 30 to the outlet conduit 18 through a bidirectional valve 32. The valve 32 includes a first outlet valve 32a controlled by a signal on line 32a1 and a second outlet valve 32b controlled by a signal on line 32b1. The valves 32a and 32b work in a complementary fashion, similar to the valve 20, so that when the valve 20a is open, the valve 32a is also open. When the valve 20b is closed, the valve 32b is also closed, thus completing the isolation of the filter 12, 14 which is not in the fluid circuit.

The system 10 shown in FIG. 1 is a non-precoatable, backwashable, autosterilizing filter pair that is capable of unattended operation for an indefinite period of time. An example of a use for the system 10 is as a pre-filter for a reverse osmosis unit which needs uninterrupted influent. Preferably, the system 10 is used downstream of the reverse osmosis feedpump and upstream of the RO pressure vessels. A portion of the filter effluent at RO feed pressure is entrapped in a pressurizer 34 in series with a pressure dome 36. A steam bubble is internally generated in the hydraulically-isolated steam dome to achieve backwash pressure. Thus, the pressurizer 34 is connected through the valves 38,40 respectively to the filters 12, 14 through the conduit legs 42, 44.

Because of the nature of the backwash, as will be discussed in greater detail, the physical integrity of the filter is important. Preferably, a filter element manufactured by Fuji Filter of Japan, and available under the brand name FujiPlate is preferred. By using the specified pore size and the filter element standards for void space per given area of an element, as are available for the filter unit from the manufacturer, the total element surface area is developed to retain the required amount of collected suspended solids for the specified run time in minutes. The area necessary to do this is tested against requirements for maximum acceptable psid clean pressure drop and 0.25 fps pore velocity. Whichever calculation requires the largest element surface area becomes the governing factor in sizing the filter assembly.

With the filter assembly sized as described above, the operating pressure, and the fluid to be treated determine the diameter of the individual filter elements, the length of the individual elements and the number of elements required. An array of elements is designed and a vessel diameter with a minimum inter-element clearance of 1 cm is chosen. The vessel size is usually comparatively quite small, for example, about 4.5 in. for a 25 gpm unit with a filter chamber of about 1 ft. in length. The exemplary unit shown in FIG. 1 thus incorporates twin filter vessels of equal size manifolded into a hydraulically parallel array with a pressurizer vessel 34 between them. On the influent and effluent manifolds, the valves 38, 40 are preferably quick acting valves affixed to pipe tees in a reversing tee pattern; however, where the pipesize is 2" and under, multiported plug valves are used as preferable. The reversing tee design just described permits a single automatic operator transfer of service between the two filters with no interruption of output from the system 10. Moreover, with the system 10 ganged as described, it is not possible to have both filters 12,14 on stream or in a backwash mode simultaneously.

Assume for discussion that the filter 12 is on line, and the filter 14 is in a standby mode. When the filter 12 reaches an increased differential pressure of the engineered value that is indicative of a predetermined particulate loading, such as 0.125 g/sq cm, pressure sensors, such as strain gauges, in the influent and effluent manifolds 28, 24 sense a critical differential pressure and automatically reverse the influent and effluent valve positions 20a, 20b and 32a, 32b. Then, the filter 12 is in a standby mode, while the filter 14 is in an active mode.

After the filter 12 is removed from line and the valves 20a and 32a are closed, the backwash valve 48 mounted on the bottom of the filter 12 opens to allow drainage of the entire element chamber of the filter 12. The water in the clearwater collector head and in the backwash conductor column remains trapped by the closed flush valve 38.

Beyond the closed flush valve 38 is the larger diameter dead leg of the pressurizer 34 and the pressurizer dome 36. A heater 52, shown representatively, heats the water contents in the leg 34 and in the dome 36 to create a steam bubble in the dome 36 to create the required backwash pressure. Typically, the heater 52 is a submersible electric heater. Backwash pressure is normally four or more times larger than the allowed differential pressure predicating backwash to assure a complete purge of any waste impregnated into the pores of the filter medium within the filters 12, 14.

After the backwash valve 48 has been open for several seconds and all of the water in the filter 12 has been dumped from the filter element chamber through the valve 48, the flush valve 38 opens very quickly so as to drive the clear fluid in the collector head 42 and the backwash conductor line through the filter elements from the inside out with nearly explosive force. Preferably, the volume of the fluid in the collector head 42 and the backwash conductor is equivalent or nearly equivalent to the volume in the filter chamber. The strong impact of the backwash under pressure as noted effectively removes accumulated debris from the surface of the filter elements for flushing through the backwash valve 48.

As the water from the leg 34 passes through the valve 38 to the filter, the volume of gas space in the pressure dome 36 begins to increase. Simultaneously, the superheated water is in a thermophysical state so that the water is beginning to flash to steam across the valve 38. As all of the water is forced from the filter 12, the steam also expands down through the filter elements. The initial thrust of the actual steam onto the elements of the filter 12 has an instantaneous value of about 140 psig; however, due to its small volume, it rapidly drops to about 10 psig, at which time the backwash valve 48 closes. The initial blast of steam assures total element cleaning and transport of any clinging waste from the filter vessel housing the filter 12. The subsequent lower pressure steam also serves as a biocide on any organic growth that may reside anywhere in the filter chamber or within the elements.

The described biocidal action is very important in overcoming one of the significant problem areas in the application of porous metal filter media to the treatment of radiation waste. With no biocidal effect, in raw water service, metal affixing bacteria tend to affix themselves to the several components with an adhesive substance, betahydroxipolysaccharide, and proliferate in spite of frequent backwashings. Eventually, the substances plug the pores of the filter medium until the filter runs are foreshortened to an unacceptable level.

Next, the flush valve 38 is closed. The filter 12 is isolated and allowed to cool. The steam inside the filter 12 condenses, creating a partial vacuum which preserves internal cleanliness and assists in the rapid transition between the filters 12, 14 at the end of the filter cycle.

The pressurizer fill valve 40 now opens for approximately a half minute and refills the pressurizer leg 34 with deionized water to a pre-engineered set-point based upon a formula calculating influent water temperature and the expansion coefficient of that water when it reaches pressurizing temperature.

As shown in FIG. 1, beyond the closed flush valve 38 is the larger diameter dead leg 34 of the pressurizer and the pressurizer dome 36.

A water sensing switch 54 in the pressurizer dead leg 34 generates a signal to command a CLOSE to the pressurizer fill valve. The heater 52 is commanded to operate so that the pressure dome 36 and the dead leg 34 reach backwash temperature and pressure in a few minutes, but in any event prior to the need for the next backwash cycle.

Figure 2:
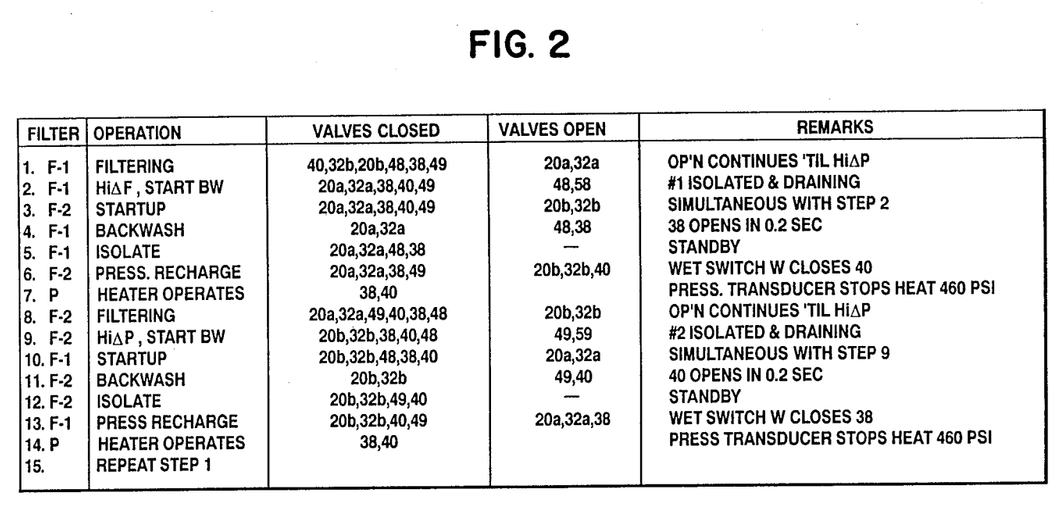
FIG. 2 is a simplified timing diagram for the control signals for the system of FIG. 1.
Figure 3:
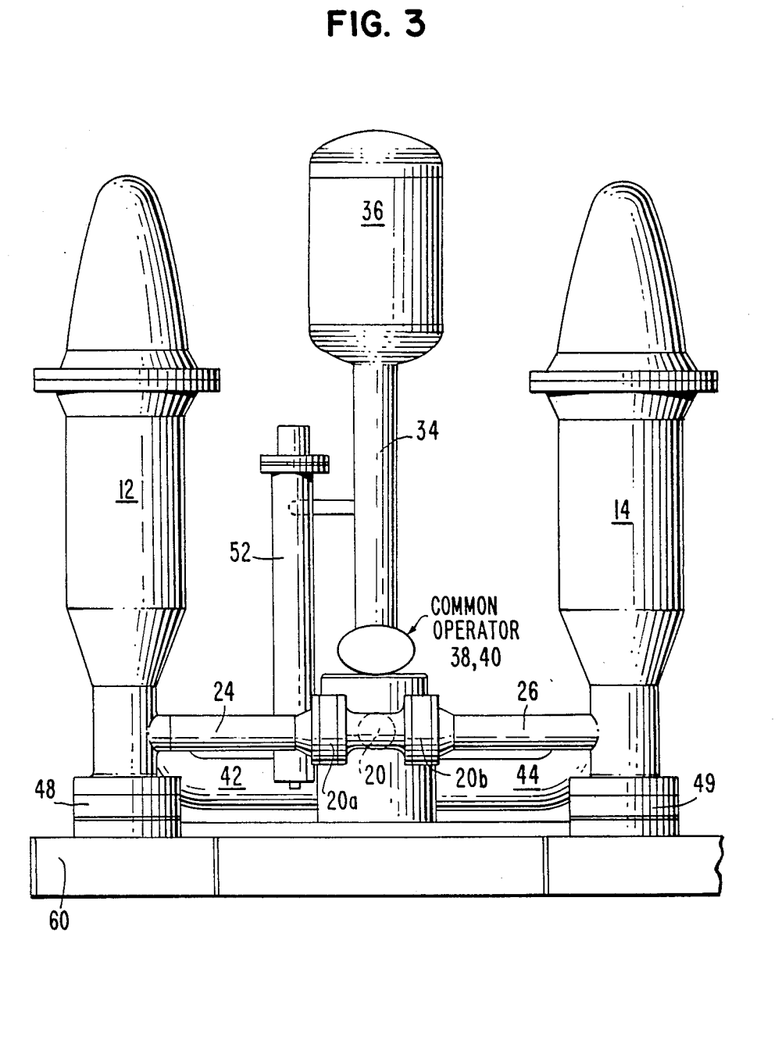
FIG. 3 is a front elevation view of a preferred embodiment according to the invention.
Figure 4:
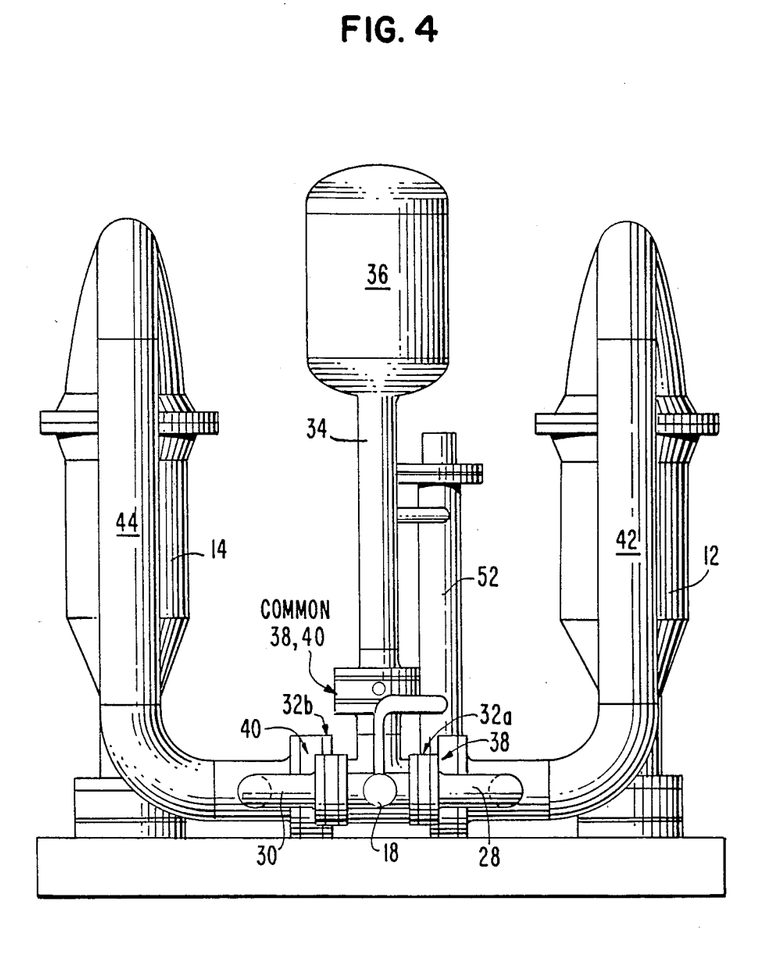
FIG. 4 is a rear elevation view of the embodiment of FIG. 3.
Figure 5:
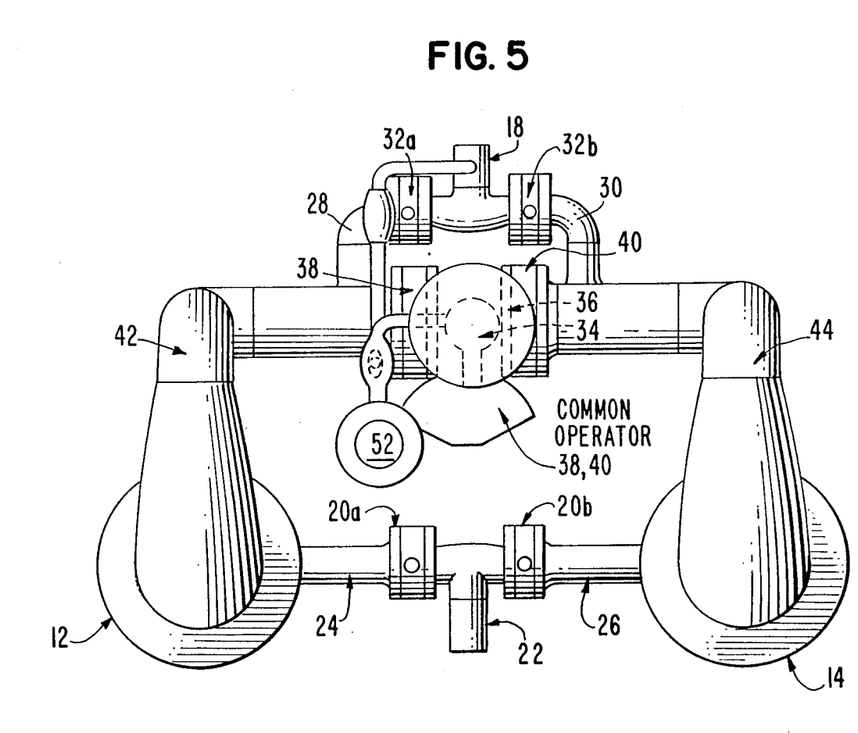
FIG. 5 is a plan view of the embodiment of FIGS. 3 and 4.
Figure 6:
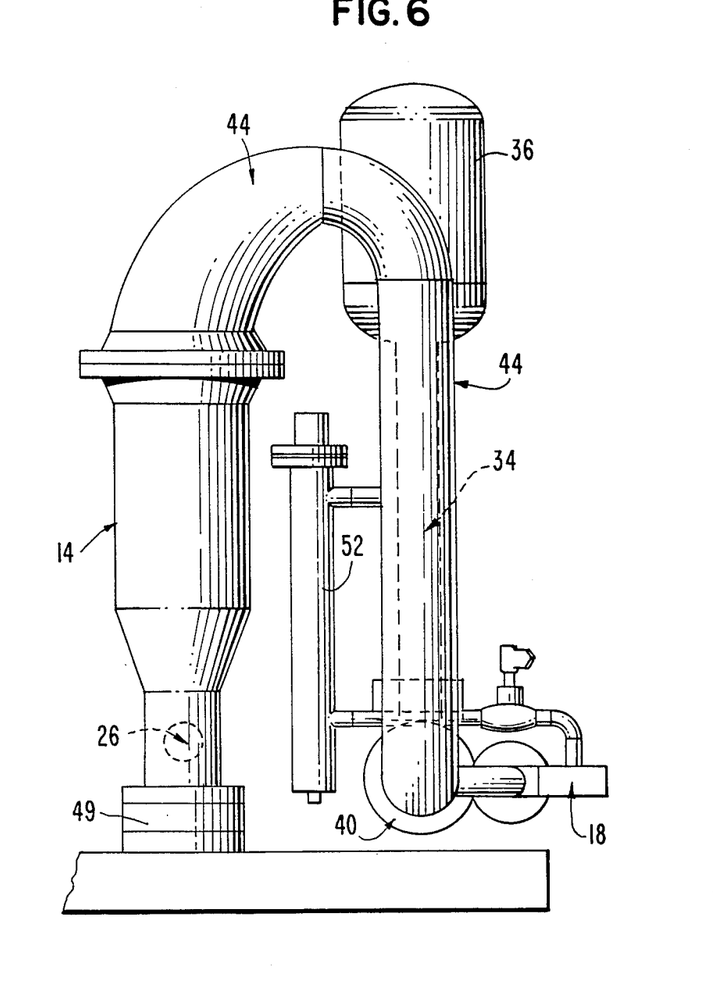
FIG. 6 is a side elevational view of the embodiment of FIGS. 3-5.

The operation of the system is under the command of a microprocessor controlled system 60 which generates the various command signals to control the operation of the system 10 according to the truth table shown in FIG. 2.

In step 1, when the filter 12 (which is also referred to as filter F-1) is filtering, the valves 20b, 32b, 48, 38, 40, and 49 are closed, as described above, while the valves 20a and 32a are open. The atmospheric valves 58 and 59 respectively located on the filters 12 and 14 are closed. This filtering operation continues until a high pressure drop is sensed, producing a pressure drop signal, indicating a clogging condition in the first filter F1, or filter 12. This pressure drop signal PD when provided to the microprocessor 60 causes a backwash cycle to be instituted.

In the backwash cycle, as shown in step 2 in FIG. 2, the valves 20a and 32a are closed, while valves 38, 40, and 49 remain closed, and the drain valve 48 is opened by a signal on the lead 48-1 from the microprocessor 60. The atmospheric valve 58 is also opened by a signal on the lead 58-1 from the microprocessor 60. The valves 58 and 48 thus permit the F1 filter 12 to drain since it is now isolated from the system 10. Simultaneously with this step 2, a startup step 3 for the F2 filter 14 is initiated by opening the valves 20b and 32b by signals on the leads 20b1 and 32b1 from the microprocessor 60. Thus, fluid is now passing from the inlet 16 to the outlet 18 through the F2 filter 14.

Step 4 denotes the backwash cycle, wherein the valves 20a and 32a remain closed, and the valve 48 remains open. The valve 38 is thus opened by a signal on the lead 38-1 in about 0.2 seconds since the valve 38 is a fast acting valve. The water in the dead leg 42 is thus rapidly pressurized to impact on the filter element because of the pressure in the pressure dome 36. The backwash cycle then continues as previously described to achieve the multiple phases of filter cleaning as previous described. Step 5 shows the isolation of the F1 filter 12 when the backwash cycle is complete, thus placing the filter 12 in a standby mode while the F2 filter is operative. Closure of the valves 48 and 38 while the valves 20a and 32a remain closed achieves the standby state.

Step 6 shows the pressure recharge step when the valves 20a, 32a, 38, and 49 are closed while the valves 20b, 32b, and 40 are open. The wet switch 54 commands the microprocessor 60 to close the valve 40 when the leg and pressure dome are satisfactorily filled.

Step 7 shows that heater operation begins to heat the water in the wet leg 34 after pressure recharging.

Steps 8 through 14 parallel steps 1 through 7 except that the F2 filter 14 is the operative filter which is backwashed while the F1 filter 12 comes on stream. Step 15 shows that step 1 is repeated demonstrating that the operation of the system is continuous under the command of the microprocessor 60.

FIGS. 3 through 6 illustrate a practical, preferred embodiment of the system according to the invention, wherein the components shown in FIG. 1 are identified with a like reference numeral. The system 10 is compactly mounted on a skid 60 for convenience. As can be seen from FIGS. 3-6, the components are readily connected using suitable connections, such as flange and tee connections, sized where appropriate and necessary to accommodate the pressures and temperatures of the system 10 as described.

The invention may be embodied in other specific forms without departing from its spirit or essential characteristics. The present embodiments are, therefore, to be considered in all respects as illustrative and not restrictive, the scope of the invention being indicated by the claims rather than by the foregoing description, and all changes which come within the meaning and range of the equivalents of the claims are therefore intended to be embraced therein.

What is claimed is:

1. A method of cleaning a liquid comprising the steps of:

filtering a flow of liquid between an inlet source and an outlet through a rigid filter element located in a filter vessel having valve means for selectively filtering and backwashing said filter element upon command;

providing a pressurized quantity of superheated liquid in a pressurizer for said liquid located at a location remote from said filter vessel, said pressurizer including means associated with said pressurizer for heating said liquid to a superheated state within said pressurizer so that a quantity of liquid and vapor of said liquid are present within said pressurizer;

forcing a liquid mass at about ambient temperature in a conduit separated from said superheated liquid and said vapor in said pressurizer by a valve to flow to said filter vessel responsive to said pressurized quantity of liquid; and backwashing said filter element with said quantity of liquid and then with steam from said superheated liquid.

2. In a fluid conducting apparatus, a combination of:

a pressurized source of superheated liquid in a pressurizer having a dead leg and vapor of said superheated liquid above said liquid in said pressurizer, said pressurizer including heating means for maintaining said liquid in a superheated state;

a liquid mass downstream from said pressurized superheated liquid in said pressurizer and separated therefrom by a first valve means in a conduit connected to an outlet of said pressurizer;

a filter for filtering liquid in a first flow direction therethrough, said filter receiving said liquid mass in a second flow direction opposite said first flow direction when said first valve means is actuated, said liquid mass thus backwashing said filter as a first phase in a backwashing cycle, said filter being located in a filter housing having respective valve means including a drain valve draining said filter housing and a vent valve for backwashing said filter housing, said filter housing having an inlet and an outlet for said liquid, said outlet of said housing being connected to said conduit for receiving said liquid mass in said conduit when said first valve means is actuated.

3. The combination as set forth in claim 2, wherein said pressurizer cooperates with said first valve means so that said pressurized superheated liquid flashes to steam across said first valve means, said steam cleaning said filter during said backwashing cycle.

4. The combination as set forth in claim 3, wherein said drain valve on said filter housing valve is normally closed when said filter is filtering liquid in said first flow direction and normally open to drain said filter through said drain valve prior to said backwash cycle.

5. A filter cleaning apparatus for cleaning a rigid filter element which filters a flow of liquid from an inlet to an outlet during a filtering cycle, comprising:

a filter housing including said filter element, said housing defining said inlet and said outlet and further including a drain valve and a vent valve in said housing to effect draining of said filter housing and backwashing upon command;

a pressurizing means including a pressurizer for maintaining a volume of superheated liquid and a vapor above said liquid in said pressurizer, said pressurizer further including a dead leg in a conduit adjacent said superheated liquid for defining a slug of liquid at or near ambient temperature, said conduit having a valve connecting said pressurizer to the outlet of said filter housing; and a heating means for heating said liquid maintained in said pressurizer to a superheated state, whereupon when said valve in said conduit is opened and said drain valve is opened, said slug of ambient temperature liquid is caused to impact said filter element to effect cleaning thereof, followed by steam from a change of state of said superheated liquid.

6. The filter cleaning apparatus as set forth in claim 5, wherein said control means cooperates with said drain valve, said vent valve and said valve in said conduit to drain said filter vessel and to admit said standing leg of water into said fluid vessel upon command.

7. The filter cleaning apparatus as set forth in claim 5, further including a second housing having a second rigid filter element connected in a parallel fluid circuit with said rigid filter element, said control means cooperating to operate one of said rigid and said second rigid filter elements in a filtering mode and the other in a standby mode, said one of said rigid filter elements being isolated from said fluid circuit during backwashing whereupon said other filter element is caused to enter into said fluid circuit.

8. The filter cleaning apparatus as set forth in claim 5, wherein said slug of liquid is about equal in volume of said filter housing for said filter element, said slug of liquid backwashing said filter element upon command from a control means connected to said vent valve and said drain valve for controlling filtering and backwashing of said filter.

9. The filter cleaning apparatus as set forth in claim 8, wherein said pressurizing means cooperates with said conduit and said valve in said conduit so that said liquid changes phase into steam across said valve in said conduit for steam cleaning said filter element.

10. The filter cleaning apparatus as set forth in claim 9, wherein said pressurizing means cooperates with said conduit and said valve in said conduit so that said steam is provided to said filter element at an initial higher pressure which gradually lowers, and so that said subsequent lower pressure steam serves as a biocide on any organic growth that may reside anywhere in the filter housing within a filter elements.

* * * * *